US006899276B2

United States Patent
Limelette et al.

(10) Patent No.: US 6,899,276 B2
(45) Date of Patent: May 31, 2005

(54) WRAPPED-CARD ASSEMBLY AND METHOD OF MANUFACTURING THE SAME

(75) Inventors: Yann Limelette, Mardie (FR); Alfredo Loreto, Rome (IT); Hayat El Yamani, Cachan (FR); Sophie Damato, Jouy en Josas (FR)

(73) Assignee: Axalto SA, Montrouge (FR)

( * ) Notice: Subject to any disclaimer, the term of this patent is extended or adjusted under 35 U.S.C. 154(b) by 20 days.

(21) Appl. No.: 10/077,669

(22) Filed: Feb. 15, 2002

(65) Prior Publication Data

US 2003/0155423 A1 Aug. 21, 2003

(51) Int. Cl.$^7$ .............................................. G06K 19/06
(52) U.S. Cl. ...................... 235/492; 235/493; 235/379; 235/380; 235/487; 283/106; 283/109; 283/110; 283/111; 283/116; 229/71; 229/92.3; 229/92.8
(58) Field of Search .......................... 229/87.06, 87.01, 229/162, 164.1, 306, 71, 92.3, 92.8; 283/74, 101, 109–111, 94, 116, 72, 75, 79–81, 106, 84, 107, 108, 904; 53/460, 569, 206, 284.3; 493/216, 186, 917; 235/492, 493, 379, 380, 487, 486; 428/40.1, 43, 42.1; 206/449, 447; 503/206

(56) References Cited

U.S. PATENT DOCUMENTS

| 3,126,211 | A | * | 3/1964 | Hieken et al. ............... 283/101 |
| 4,742,954 | A | * | 5/1988 | Shishido ...................... 229/92.8 |
| 4,882,473 | A | * | 11/1989 | Bergeron et al. ............. 463/25 |
| 5,029,901 | A | * | 7/1991 | Dotson et al. ................ 462/55 |
| 5,039,652 | A | * | 8/1991 | Doll et al. .................... 503/206 |
| 5,184,658 | A | * | 2/1993 | Bauman ....................... 150/147 |
| 5,326,964 | A | * | 7/1994 | Risser ......................... 235/487 |
| 5,380,046 | A | * | 1/1995 | Stephens ...................... 283/75 |
| 5,427,832 | A | * | 6/1995 | Longtin ....................... 428/42.1 |
| 5,677,524 | A | * | 10/1997 | Haghiri-Tehrani .......... 235/492 |
| 5,700,036 | A | * | 12/1997 | Smith, III .................... 283/72 |
| 5,700,037 | A | * | 12/1997 | Keller ......................... 283/107 |
| 5,842,629 | A | * | 12/1998 | Sprague et al. ............... 229/71 |
| 5,941,375 | A | * | 8/1999 | Kamens ....................... 206/38 |
| 5,975,302 | A | * | 11/1999 | Young ......................... 206/449 |
| 6,027,597 | A | * | 2/2000 | Main ........................... 156/253 |
| 6,176,430 | B1 | * | 1/2001 | Finkelstein et al. ......... 235/487 |
| 6,193,163 | B1 | * | 2/2001 | Fehrman et al. ............ 235/488 |
| 6,315,206 | B1 | * | 11/2001 | Hansen et al. .............. 235/487 |
| 6,349,829 | B1 | * | 2/2002 | Matheis et al. ............. 206/449 |
| 6,366,777 | B1 | * | 4/2002 | Uusitalo ...................... 455/433 |
| 6,439,613 | B2 | * | 8/2002 | Klure .......................... 283/62 |
| 6,448,638 | B1 | * | 9/2002 | Fidalgo et al. .............. 257/679 |
| 6,454,165 | B1 | * | 9/2002 | Dawson ....................... 235/381 |

FOREIGN PATENT DOCUMENTS

JP          2000247082 A  *  9/2000  ............ B24F/7/00

* cited by examiner

Primary Examiner—Karl D. Frech
Assistant Examiner—Daniel Walsh
(74) Attorney, Agent, or Firm—Pebr Jansson

(57) ABSTRACT

A wrapped-card assembly comprising a data-encoded card enclosed in a wrapping. The data-encoded card comprises confidential and non-confidential information in a visible form. The wrapping comprises an opaque area and a transparent area. The opaque area covers at least partially the confidential information. The transparent area covers at least partially the non-confidential information.

10 Claims, 1 Drawing Sheet

WRAPPED-CARD ASSEMBLY AND METHOD OF MANUFACTURING THE SAME

FIELD OF THE INVENTION

The invention concerns a wrapped-card assembly comprising a wrapping and a data encoded card enclosed therein. The invention also concerns a method for manufacturing such a wrapped-card assembly.

BACKGROUND OF THE INVENTION

A prior art wrapped-card assembly for a GSM telephone service comprises a wrapping and enclosed therein a data encoded card and an auxiliary card. The data-encoded card comprises a subscriber identity module ("SIM")for accessing the GSM telephone service. The auxiliary card comprises confidential and non-confidential information in a printed form. The confidential information comprises two secret codes needed to access the GSM telephone services, namely a personal identification number ("PIN") and a personal unblocking key ("PUK"). The PIN and the PUK are covered by a non-transparent scratch material. The confidential information remains therefore non readable until an end-user opens the wrapping and subsequently removes the scratch material. The non-confidential information is readable through the wrapping. It can be, for example, a magnetic strip, a laser strip or a code bar containing all the information related to the manufacturing process such as, for example, an identification number or the price. In a matching step, for each data-encoded card the corresponding auxiliary card is selected. The data-encoded card and the corresponding auxiliary card are wrapped into a single wrapping. The wrapping can be made of a transparent material.

SUMMARY OF THE INVENTION

It is an object of the invention to allow a cost reduction.

According to an aspect of the invention, a wrapped-card assembly comprises a data-encoded card enclosed in a wrapping, said data encoded card comprising confidential and non-confidential information in a visible form, wherein said wrapping comprises:
- an opaque area which covers at least partially the confidential information and
- a transparent area which covers at least partially the non confidential information.

The wrapping is a sealed envelope, namely an envelope comprising four sides that are sealed. Advantageously, the wrapping is made of one single material.

The confidential information remains non-visible until the opening of the wrapping. Compared with the conventional wrapped-card assembly, the invention does not require an auxiliary card and therefore no matching step anymore. Furthermore, the invention does not require the depositing of scratch material. Consequently, the invention allows a cost reduction.

These and other aspects of the invention will be described in greater detail hereinafter with reference to drawings.

DETAILED DESCRIPTION

Figure 1:
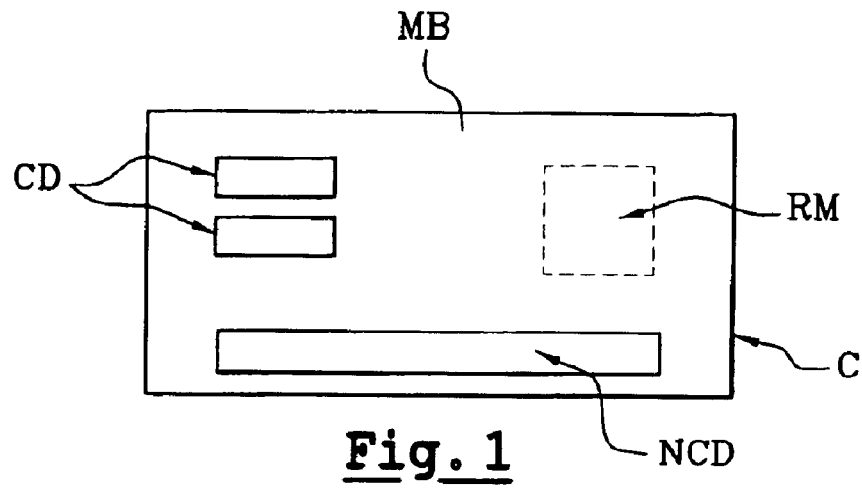
FIG. 1 illustrates an example of data encoded card according to the invention.

FIG. 1 illustrates a data-encoded card C. The data encoded card C comprises a main body MB and a subscriber identity module ("SIM") RM which is detachable from the main body MB. The main body comprises confidential information CD and non-confidential information NCD in a visible form. More specifically, the confidential information comprises a PIN and a PUK and the non-confidential information comprises, for example, an identification number or the price of the wrapped card.

Figure 2:
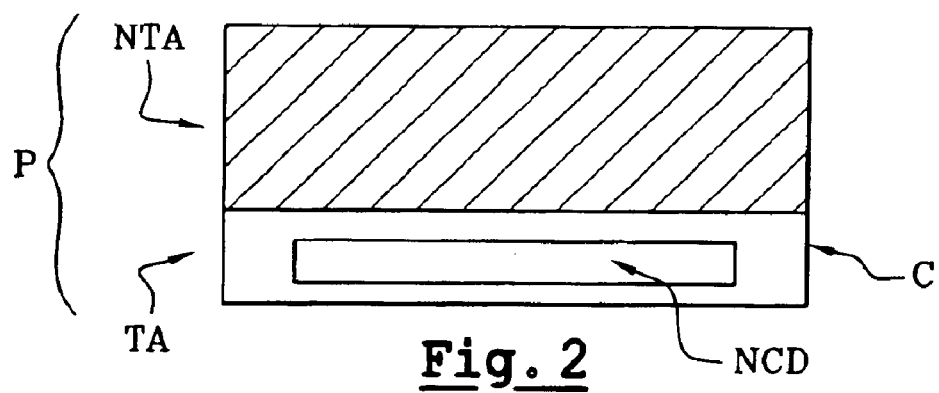
FIG. 2 illustrates a wrapped-card assembly according to the invention.

FIG. 2 illustrates a wrapped-card assembly comprising the data encoded card C which is enclosed by a wrapping film P. The wrapping film P has a transparent area TA and a non-transparent area NTA. The non-transparent area NTA covers the confidential data CD illustrated in FIG. 1. The non-confidential data NCD can be read through the transparent area TA of the wrapping film P. The wrapping film P may be, for example, a cellophane film, a polystyrene film, a polypropylene film or any other well-known material used to make a wrapping film. The non-transparent area NTA of the wrapping film P is, for example obtained by printing an opaque ink. The opaque ink is, for example, a layer of metallic printing or a layer of black printing. The non-transparent area NTA can be uniformly of the same colour, for example grey. The non-transparent area can also be made of a more complicated texture. Preferably the data encoded card is wrapped into the wrapping film P subsequent to a personalization step, in which the confidential information is printed. The wrapping film P is sealed by means of, for example, a sealing jaw. The wrapping film P in its sealed state constitutes the warranty that nobody read the confidential information.

Figure 3:
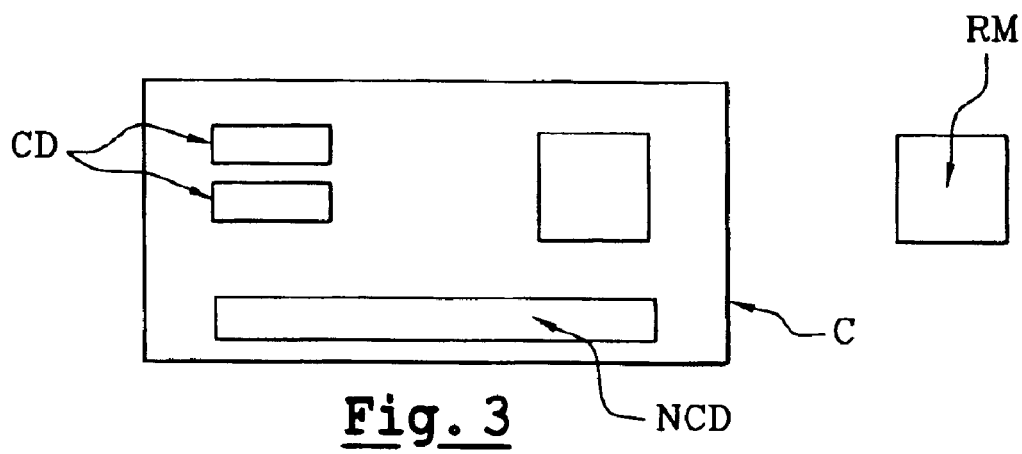
FIG. 3 illustrates a card body of a data encoded card and a removable integrated circuit module, which has been detached from the card body.

FIG. 3 illustrates that an end user may open the sealed wrapping and detaches the subscriber identity module ("SIN") RM. The end user can put the subscriber identity module ("SIM") in a mobile phone. The main body MB containing the PIN and PUK can be stored in a secured place.

The embodiment described above is within the context of GSM telephone services and uses a subscriber identity module ("SIM"). The invention can be applied in other types of services, for examples banking, e-purse or identification of person for accessing a restricted area. The subscriber identity module ("SIM") could be substituted by any other removable integrated circuit module associated with confidential information CD.

Any suitable material may be used for wrapping. For example, a wrapping made of cellulose i.e. a paper can be used to wrap the data-encoded card C. This wrapping can be in particular a sealed envelope in which the data encoded card has been put. An opening in the envelope leaves the non-confidential information visible.

There is many alternatives to the embodiment described with reference to the drawings (FIGS. 1–3). For example, although FIG. 1 illustrates that the confidential CD and non-confidential NCD information are in the same side, it is possible to have confidential information CD on one side and non-confidential information NCD on the other side.

In an alternative embodiment the non-confidential information NCD may be comprised on the subscriber identity module ("SIM").

The confidential information CD and non-confidential information NCD may be, for example, printed, engraved or embossed.

What is claimed is:

1. A wrapped-card assembly comprising data-encoded card enclosed in a wrapping, the data encoded card comprising confidential and non-confidential information in a visible form, the wrapping being made of a single material, the wrapping comprising:

an opaque area which covers at least partially the confidential information; and a transparent area which covers at least partially the non-confidential information;

wherein the wrapping is a sealed envelope.

2. The wrapped-card assembly according to claim 1, wherein the data encoded card comprises a main body which comprises the confidential information and an integrated circuit module which is detachable from the main body.

3. The wrapped-card assembly according to claim 1, wherein the confidential information comprises a personal identification number and a personal unblocking key.

4. The wrapped-card assembly according to claim 1, wherein the wrapping is made of a cellophane film.

5. The wrapped-card assembly according to claim 1, wherein the wrapping is made of a polypropylene film.

6. The wrapped-card assembly according to claim 1, wherein the wrapping is made of a polypropylene film.

7. The wrapped-card assembly according to claim 1, wherein the opaque area comprises opaque ink.

8. The wrapped-card assembly according to claim 7, wherein the opaque ink is a metallic ink.

9. A method of manufacturing a wrapped card assembly comprising:

a personalization step in which a data-encoded card which is provided with non-confidential information in a visible form, is further provided with confidential information in a visible form; and a wrapping step in which the data-encoded card is enclosed and sealed in a wrapping so as to obtain a sealed envelope made of a single material, the wrapping comprising an opaque area and a transparent area so that the opaque area covers at least partially the confidential information and so that the transparent area covers at least partially the non confidential information.

10. The method of manufacturing as claimed in claim 9, wherein the personalization step is immediately followed by the wrapping step.

* * * * *